United States Patent [19]
Batt

[11] 3,899,221
[45] Aug. 12, 1975

[54] THRUST BEARINGS
[75] Inventor: Robert Stanley Batt, Barby, England
[73] Assignee: The Torrington Company, Limited, Coventry, England
[22] Filed: Feb. 26, 1974
[21] Appl. No.: 445,958

[30] Foreign Application Priority Data
Feb. 28, 1973 United Kingdom............... 9797/73

[52] U.S. Cl.................. 308/3 R; 308/217; 308/235
[51] Int. Cl.².................F16C 5/00; F16C 17/00; F16C 21/00; F16C 23/02
[58] Field of Search............ 308/227, 3 R, 216, 217, 308/202, 235

[56] References Cited
UNITED STATES PATENTS
| | | | |
|---|---|---|---|
| 902,810 | 11/1908 | Foster | 308/217 |
| 2,864,269 | 12/1958 | Mottu | 308/3 R |
| 3,144,284 | 8/1964 | Ortegren | 308/217 |
| 3,418,026 | 12/1968 | Ericson | 308/202 |
| 3,809,446 | 5/1974 | Pitner | 308/217 |

Primary Examiner—Lloyd L. King
Attorney, Agent, or Firm—Frank S. Troidl

[57] ABSTRACT

This is an apparatus for use in a thrust bearing. A plurality of rolling member carriers are arranged to move along the thrust race. A pocket is formed in each carrier and contains a rolling member such as a roller.

Means are provided for preventing rotation of each carrier about its own center in its movement along the race.

14 Claims, 8 Drawing Figures ic 3,899,221

THRUST BEARINGS

IMPROVEMENTS IN OR RELATING TO THRUST BEARINGS

This invention concerns thrust bearings. More particularly, this invention is a novel apparatus for use in a thrust bearing.

The manufacture of large bearings is always expensive, not the least reason for which is that large machines are required with which to make them. Additionally, machinery size limitations impose manufacturing restrictions on the bearing maker.

In the case, for example, of a requirement for an annular thrust bearing of, say, 1,200 mm. diameter which has a relatively small cross section of about 25 mm. between its internal and external peripheries and uses a roller of some 8 mm. diameter, it can be seen that a. for the manufacture of a metal cage a large turning machine would be necessary both for providing the cage blank and also for creating roller retaining pockets;

b. for the manufacture of a plastic or a sintered cage a machine with a large shot capacity and a large platten size, would be necessary.

It has already been proposed to meet this problem by making the cage from a number of segments and fixing these to each other to create a complete assembly, the fixing being by various means such as 'dovetailing'and-/or glueing or welding. This method has proven successful but also has its limitations, one of which is the accommodation of the length tolerance necessary for each segment, which, of course, poses a bigger problem for larger bearings. The greater the number of segments used, the greater the total resulting build-up of circumferential tolerance. Another limitation is that as the segment body is curved circumferentially in an arc to suit the bearing diameter for which it has been designed, it is totally unsuitable for use in any other size of bearing.

According to the present invention, I provide apparatus for use in a thrust bearing comprising a plurality of individual carriers arranged in circularly adjacent but mutually independent relationship and each formed with a single rolling member receiving pocket; and means on each carrier engageable with the bearing race for preventing rotation of the carrier about its own center in its movement in a circular path around said race.

By making up the cage from individual carriers which are not mechanically fixed to one another, so that the carriers are allowed to operate individually, the invention avoids the principal limitations of the prior art and enables each size carrier to be used over a range of bearing sizes. In this connection, it will be appreciated that the ability of the carriers to "float" freely in a circumferential direction helps to overcome what would otherwise be a difficulty due to the varying circumferential clearance between carriers.

The maximum benefit is obtained from the invention when the carriers are incresed in number and decreased in size to the greatest extent practicable having regard to bearing design considerations, intended operating conditions and cost. In the ultimate and preferred condition where there is only one rolling member such as a roller, per carrier, there is no in-built included angle between the rollers, such as occurs when more than one roller per carrier is used; and this preferred arrangement is particularly flexible in being suitable for use in a wide range of bearing diameters.

It will readily be appreciated that the ability of each size of carrier to be used over a wide range of bearing sizes offers substantial manufacturing advantages. The small size of the carriers themselves, compared with one-piece cages or of cages made from segments having a plurality of roller-receiving pockets, enables them to be made in much smaller machines of lower cost and higher operating speeds than would otherwise be possible and also enables relatively low cost tooling to be used in those machines.

The anti-rotation means for preventing rotation of the carriers about their own centers may conveniently be placed at or adjacent either or both the radially inner and the radially outer edges of each carrier and may for example take the form of circumferentially spaced pegs or the like projections intended to locate in a groove formed as part of the thrust race surface or adjacent to the race. Preferably, a pair of projections are provided on each carrier adjacent the radially outer edge thereof. As an alternative to the projections, one or both radial edges of each carrier may carry a dependent flange engageable with a cooperating surface of or near to the race.

Where the cage is required to be of so-called race-riding construction (i.e., where it is to be supported by the race rather than by the rollers), the anti-rotation means may simultaneously act as spacers to support the carriers at a required distance from the race surface, or alternatively, additional spacers may be provided for this purpose.

The invention will be further understood by reference to the following detailed description and drawings in which.

Figure 6:
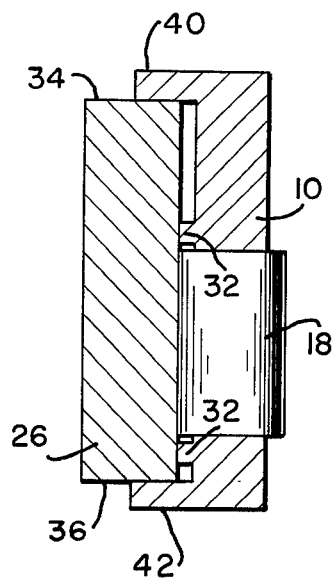
Figure 7:
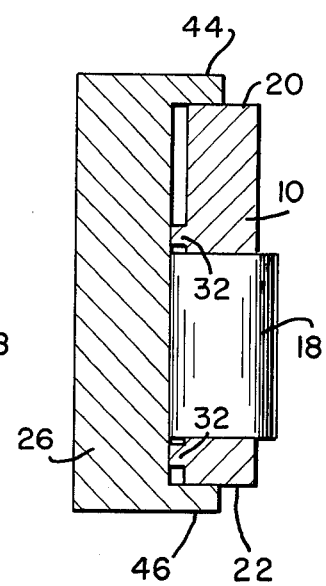
Figure 8:
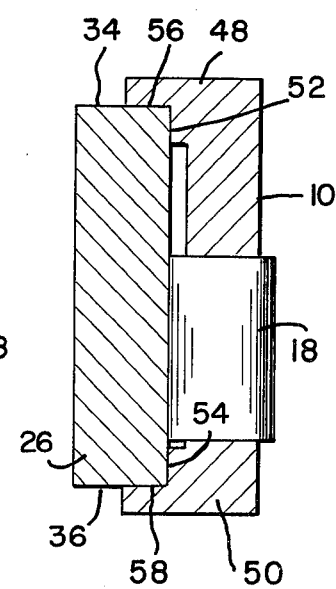

FIG. 6, FIG. 7, and FIG. 8 are side elevational views partly in section, showing further modifications of the invention.

Figure 2:
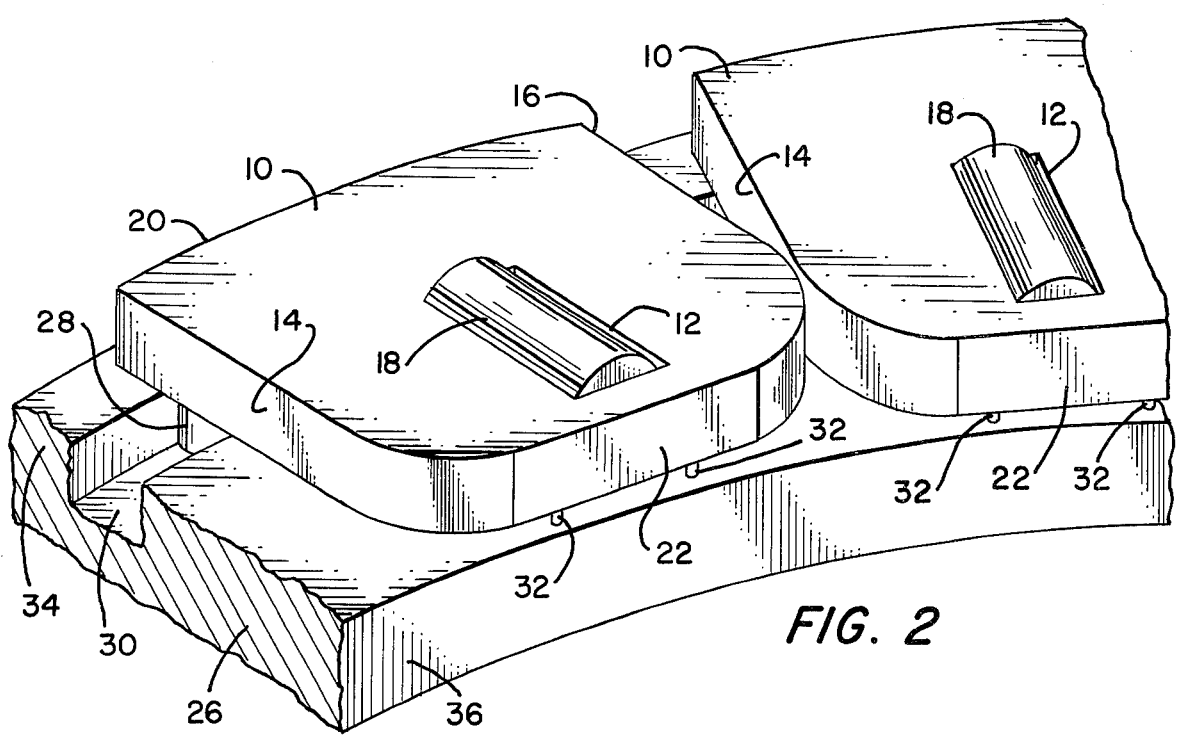
FIG. 2 is a fragmentary perspective view of a part of a thrust bearing showing roller carriers mounted on the thrust race.
Figures 1, 3, 4:
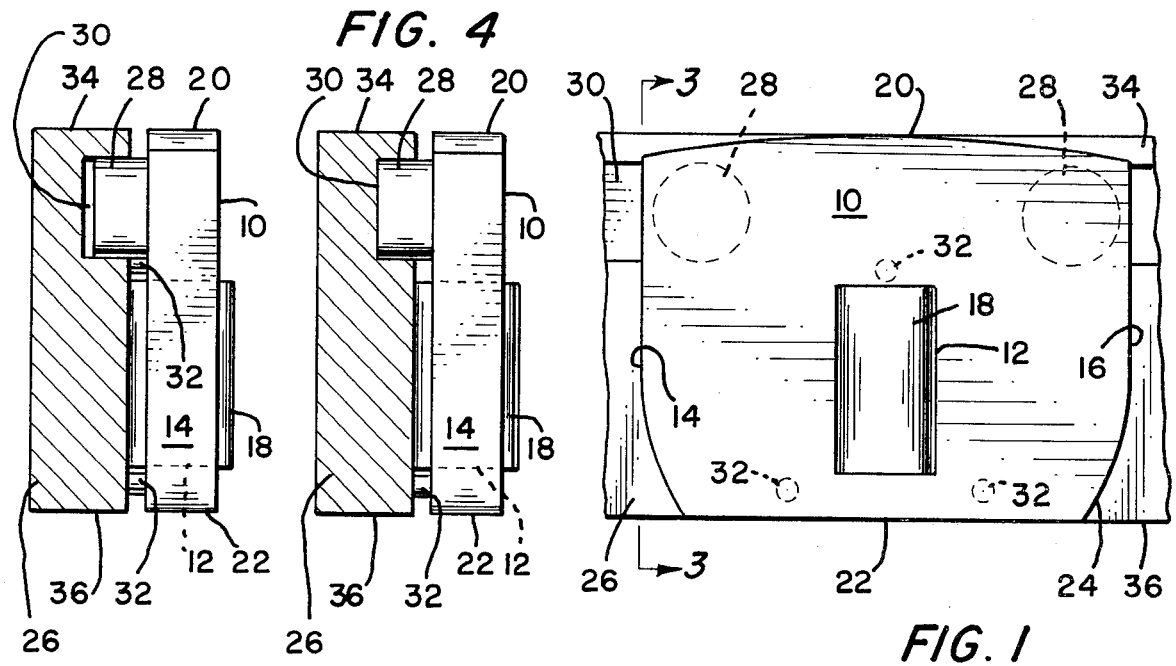
FIG. 1 is a fragmentary plan view of a roller carrier shown mounted on a thrust race.
FIG. 3 is a side elevational view, partly in cross section, taken along lines 3—3 of FIG. 1.
FIG. 4 is a side elevational view, partly in section, showing a modification of the apparatus shown in FIGS. 1 through 3, inclusive.

As shown in FIGS. 1 and 2, a carrier 10 for a thrust bearing cage takes the form of a flat plate or slab which, in its broadest sense, is of generally rectangular shape subject to the provisions referred to below. The carrrier 10 may be made of metal or of a plastics material, according to its intended use, and will be seen to have a radially directed pocket 12 formed between its circumferentially spaced sides 14, 16. Within the pocket 12 is received a roller 18.

The radially outer edge 20 of each carrier 10 is circumferentially curved, the curve having a radius which is that of the outer periphery of the smallest complete thrust bearing in the assembly of which the carrier is intended to be used. The required radius of the radially inner edge of each carrier is that of the inner periphery of the largest complete thrust bearing in which the carrier is to be used. Since hypothetically this latter radius is infinite, in practice the edge 22 is straight.

The radially inner corner regions of the edges 14 and 16 will be seen to be rounded as indicated at 24. The curvature of these rounded corner regions 24 is calculated both to ensure that, in an assembled cage, a change of movement of the cage during operation should not enlarge the apparent circumferential width occupied by the carrier 10 and also that the angle subtended between two adjacent carriers in the cage remains such that a straight line drawn between the center points of two adjacent rollers 18 will always pass through the point of contact of the two carriers.

These latter conditions will be best appreciated from a consideration of FIG. 2 which shows a part of a thrust bearing cage assembled by positioning a plurality of carriers 10 in side-by-side relationship on a thrust race 26. Since it is of the essence of the invention that the carriers 10 are not mechanically connected to one another, it is essential to prevent each carrier from rotating about its own center region as it travels along its circular path around the thrust race 26; this liability to rotation deriving from the tendency of the roller 18 to continue in a straight line rather than following that circular path. For this purpose, each carrier 10 is provided with a pair of circumferentially spaced projections shown as being in the form of pegs 28 which engage in a groove 30 provided in the race surface of the race 26. The groove 30 is located radially outwardly of the radially outer ends of the pockets in the carriers. The pegs 28 are positioned such that the line joining their centers is at right angles to the roller axis; and the distance between those centers is equal to or greater than the roller length, thus ensuring that since the load on the pegs 28 is the reaction couple to the couple experienced by the roller 18 as a result of its own tendency to rotate lengthwise about its own center point, then the load exerted on each peg 28 is no greater, than that between the end of the roller and the side of the carrier pocket 12 against which it abuts. It will also be seen from the drawings that the pegs 28 are positioned radially outwardly of the radially outer ends of the pockets 12 and hence, of the rollers 18 so that whatever the size of the bearing in which the carriers are used, the roller path does not overlap the groove 30.

To enable the cage to be race-riding it is supported above the race surface of the race 26, independently of the rollers 18, by additional projections 32, of which two projections are circumferentially spaced along the radially inner edge region of each carrier while a third projection is situated on its radial bisector and adjacent the radially outer end of the pocket 12. It will be noted that all three projections 32 are outside the path described by the rollers 18 on the race surface whereby, in conjunction with the race-riding nature of the cage, it is ensured that under no circumstances does the cage remove any lubricant film from the raceway surface which the rollers traverse.

It will be appreciated that other carrier anti-rotation means than the pegs 28 may be provided within the scope of the invention. For example, in place of the pegs 28, each carrier may have at its radially outer and/or at its radially inner edge 20 or 22, respectively, a dependent flange intended to overhang the adjoining axially directed edge 34 or 36 of the race 26.

As shown in FIG. 6, dependent flanges 40 and 42 are provided at the radially outer edge and at the radial inner edge, respectively, of the carrier 10. Flanges 40 and 42 overhang edges 34 and 36, respectively, of thrust race 26. In FIG. 6, the sectional view is taken through the peg 32 situated on the radial bisector of the carrier and through one of the two pegs 32 which are circumferentially spaced along the radially inner edge region of the carrier 10.

Alternatively, the edges 34 and/or 36 may be axially extended to provide the race 26 with flange means for guiding the carrier 10 at either or both of its edges 20 or 22. FIG. 7, which is a sectional view similar to FIG. 6, shows an arrangement with flanges 44 and 46 extending axially from the outer edge and the inner edge, respectively, of the race 26 for guiding the carrier 10 at both of its edges 20 and 22.

Again, whatever the nature of the anti-rotation means, the same may be or may be a part of the support whereby the carrier is maintained in the aforementioned race-riding condition. Thus, the pegs 28 may be sufficiently long to ride on the bottom of the groove 30, as shown in FIG. 4 whereby the projection 32 situated centrally of the carrier pocket 12 in FIG. 1 may be eliminated.

Where flanges take the place of the pegs 28 on the carrier 10, those flanges may be provided at their inner ends with a stepped configuration whereby the stepped portion adjoining the carrier itself rides on the race 26 to support the carrier.

As shown in FIG. 8, the roller carrier 10 is provided with a stepped flange 48 at its outer edge and a stepped flange 50 at its inner edge. The portions 52 and 54 of steps 48 and 50, respectively, are parallel to the face of the race 26 and abut against said face. The outer adjacent portions 56 and 58 which are perpendicular to portions 52 and 54, respectively, overhang the corresponding circumferential edges 34 and 36, respectively, of the race 26.

In the embodiment of FIG. 8, the pegs 32 shown in the remaining embodiments are unnecessary. The carrier 10 is kept spaced from the thrust race 26, except for the portions 52 and 54 of the stepped flanges 48 and 50, respectively, by the particular configuration.

Figure 5:
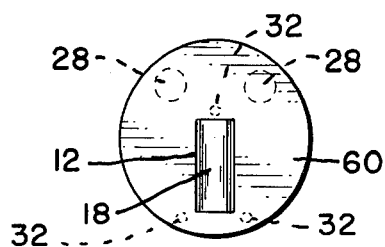
FIG. 5 is a plan view of a futher modification of the invention.

For certain purposes, the roller carrier may be in the shape of a disk 60, as shown in the embodiment of FIG. 5. A disk carrier is easier to manufacture than the generally rectangularly shaped carriers, particularly if plastic molding is required. Disk 18 is provided with circumferentially spaced pegs 28. The spacing of the pegs 28 are equal to or slightly greater than the length of the roller 18. As in the other embodiments, the spaced pegs 32 are provided adjacent the inner edge of the pocket 12 with a third ped 32 adjacent the outer edge of the pocket 12 and along the bisector of the disk 60. The pegs 32 are located outside of the path of the rollers 18 so as not to interfere with the lubrication.

The cage carriers described herein may be produced by a plastics molding operation, or by a sintering process, or they may be metal pressings or even machined from solid metal should a particular bearing application so require. The guiding pegs or flanges and/or the carrier race-riding supports may be formed integrally with the carriers or they may be secured separately thereto. For example, where the carriers are made of a plastics material, the anti-rotation pegs may be separate steel pegs to provide better wear. Additionally or alternatively, the pegs themselves may be fitted with small bearings to reduce friction.

The scope of the invention is intended to embrace not only the assembled thrust race, but also the individual carriers and the cage made therefrom as severally described and illustrated herein.

I claim:

1. Apparatus for use in a thrust bearing comprising: an annular race; a plurality of individual rolling member carriers arranged to move along said race; a single pocket formed in each carrier; a rolling member located in said pocket; and means for preventing rotation of each carrier about its own center in its movement along said race.

2. The apparatus of claim 1 wherein each carrier is in the form of a flat plate of substantially rectangular shape with the inner edge of said carrier being straight and the outer edge of said carrier being curved.

3. The apparatus of claim 1 wherein each carrier is in the form of a disk.

4. The apparatus of claim 1 wherein the means for preventing rotation of each carrier about its own center comprises an annular groove formed in the race at a position on the race radially outwardly of the radially outer ends of the pockets in the carriers; and at least one peg extending from each carrier into said annular groove.

5. The apparatus of claim 4 wherein there are two circumferentially spaced pegs positioned radially outwardly of the radially outer ends of the pocket.

6. The apparatus of claim 5 wherein the pegs are sufficiently long to ride on the bottom of the annular groove.

7. The apparatus of claim 1 wherein the means for preventing rotation of each carrier about its own center comprises: a flange on at least one of the circumferential edges of the carriers, said flange overhanging the corresponding circumferential edge of the race.

8. The apparatus of claim 7 wherein there is a flange on each circumferential edge of the carriers, and overhanging the corresponding circumferential edges of the race.

9. The apparatus of claim 1 wherein the means for preventing rotation of each carrier about its own center comprises: a flange on at least one circumferential edge of the thrust race, said flange extending along the corresponding circumferential edges of the carriers.

10. The apparatus of claim 9 wherein there is a flange extending from each circumferential edge of the race with each flange extending along the corresponding circumferential edges of the carriers.

11. The apparatus of claim 10 wherein each flange is provided at their inner ends with a stepped configuration with the portion of the step parallel to the face of the race abutting against said face and the outer adjacent portion perpendicular to said portion overhanging the corresponding circumferential edge of the race.

12. Apparatus for use in a thrust bearing comprising: an annular race; a plurality of individual rolling member carriers arranged to move along said race; at least one pocket formed in each carrier; a rolling member located in said pocket; means for preventing rotation of each carrier about its own center in its movement along said race; and spacer members extending from each carrier into contact with the race face.

13. The apparatus of claim 12 wherein the spacer members consist of at least one peg.

14. The apparatus of claim 13 wherein there are three pegs; two of said pegs being circumferentially spaced along the radially inner edge of each carrier and the third peg being located on the radial bisector of each carrier and adjacent the outer edge of the pocket.

* * * * *